United States Patent
Wolfe et al.

(10) Patent No.: US 9,240,291 B2
(45) Date of Patent: Jan. 19, 2016

(54) RUGGED KEYPAD

(71) Applicant: Multinational Resources, Inc., Exeter, NH (US)

(72) Inventors: Christopher Wolfe, Derry, NH (US); Steve Dunham, Penacook, NH (US)

(73) Assignee: Multinational Resources, Inc., Newfields, NH (US)

( * ) Notice: Subject to any disclaimer, the term of this patent is extended or adjusted under 35 U.S.C. 154(b) by 268 days.

(21) Appl. No.: 13/873,523

(22) Filed: Apr. 30, 2013

(65) Prior Publication Data

US 2013/0306450 A1 Nov. 21, 2013

Related U.S. Application Data

(60) Provisional application No. 61/640,957, filed on May 1, 2012.

(51) Int. Cl.

| | |
|---|---|
| *H01H 9/02* | (2006.01) |
| *H01H 13/04* | (2006.01) |
| *H01H 19/04* | (2006.01) |
| *H01H 21/04* | (2006.01) |
| *H01H 13/704* | (2006.01) |
| *G07F 19/00* | (2006.01) |
| *G07F 7/10* | (2006.01) |
| *G06F 21/86* | (2013.01) |

(52) U.S. Cl.
CPC ........... *H01H 9/0264* (2013.01); *G07F 7/1033* (2013.01); *G07F 19/2055* (2013.01); *H01H 13/704* (2013.01); *G06F 21/86* (2013.01); *H01H 2231/006* (2013.01); *H01H 2239/002* (2013.01); *H01H 2239/032* (2013.01)

(58) Field of Classification Search
CPC ......... H01H 9/02; H01H 13/04; H01H 19/04; H01H 21/04; H01H 2239/056; H01H 2239/3032; H01H 2239/038; H01H 2231/006; H01H 2223/044; H01H 2223/00; H01H 2209/016; H01H 2203/05
See application file for complete search history.

(56) References Cited

U.S. PATENT DOCUMENTS

| | | | | |
|---|---|---|---|---|
| 4,367,003 | A * | 1/1983 | Frantz | 439/347 |
| 5,051,539 | A * | 9/1991 | Leathers-Wiessner | 174/15.7 |
| 5,197,315 | A * | 3/1993 | Zagoroff | 70/417 |
| 7,270,275 | B1 * | 9/2007 | Moreland et al. | 235/492 |
| 2007/0152042 | A1 * | 7/2007 | Mittler | 235/383 |
| 2008/0278353 | A1 * | 11/2008 | Smith et al. | 341/22 |
| 2010/0328113 | A1 * | 12/2010 | Henry et al. | 341/24 |
| 2012/0009826 | A1 | 1/2012 | Selwood | |

* cited by examiner

*Primary Examiner* — Edwin A. Leon
*Assistant Examiner* — Anthony R. Jimenez
(74) *Attorney, Agent, or Firm* — Kimberly A. Peaslee (57) ABSTRACT

A tamper-resistant or tamper-evident keypad device for use in secure transactions. The keypad comprises multiple security mechanisms to prevent tampering to the device, and thus access to users' private information. The keypad is made of resilient materials and contains a tamper-resistant collar for housing the keypad's connector interface. The keypad comprises a multi-layered printed circuit board with at least two internal security-shield layers comprising switch trace protection, as well as additional security layers for tamper protection. The keypad comprises a silicon-rubber keypad actuator that engages tamper switches on the flexible security circuit. The keypad comprises an optional dome layer.

13 Claims, 12 Drawing Sheets

RUGGED KEYPAD

CROSS-REFERENCE TO RELATED APPLICATIONS

The present application claims the benefit of Provisional Patent Application Ser. No. 61/640,957 filed May 1, 2012, which is incorporated herein by reference.

FIELD OF THE INVENTION

The present invention relates to a rugged keypad capable of resisting tampering attempts. More particular, it relates to a keypad capable of resisting third parties' attempts to acquire signals associated with key strokes on the keypad.

BACKGROUND OF THE INVENTION

Various devices require a user to enter data into a system using a keypad or other input device (hereinafter a "keypad"). The location of the keypad may subject it to various environments including adverse weather and the potential for tampering and/or vandalism.

The data being entered by a third party user may be sensitive, such as a PIN (personal identification number) or other personal or financial information. It is desirous that the keypad be resistant to both tampering and vandalism. While vandalism is not condoned, the signs of vandalism are generally recognized by the owner of the keypad or the third party user of the keypad. In contrast, if a criminal is successful in tampering, the owner or the third party user may not appreciate that the keypad has been tampered with and may use it, therein potentially granting the thief access to the third party user's information. Therefore, it is also desirable that the keypad be resistant to tampering, and show visible signs if the device has been tampered with.

SUMMARY OF THE INVENTION

It is recognized that there are certain points/locations within a keypad, which a criminal/thief may attempt to access. The keypad of the present invention has certain elements/features to reduce the possibility that a thief can access these locations without necessarily rendering the keypad unuseable, or at a minimum placing a user on notice of the tampering.

One aspect of the present invention is a keypad for connecting to a machine having a connector interface, comprising a housing having a front panel with an outer face and inner surface, the front panel having a plurality of openings and a plurality of sides projecting from the front panel defining an area; a plurality of keycaps protruding through the openings on the front panel from the inner surface to the outer face; a multi-layer printed circuit board having a front face having a plurality of conductive pathways, wherein the movement of one of the keycaps connects with one of the plurality of conductive pathways, the multi-layer printed circuit board having a back face with a plurality of terminals (contact points) associated with at least some of the conductive pathways; a plurality of connectors extending from terminals on the back face of the circuit board to the connector interface of the machine; and a collar for encircling the connectors that extend from the back face of the multi-layer printed circuit board to the machine to limit access to the plurality of connectors.

In one embodiment, the keypad for connecting to a machine having a connector interface has a collar made of hardened tool steel.

In one embodiment, the keypad for connecting to a machine having a connector interface has a housing comprising tamper-resistant metal.

In one embodiment, the keypad for connecting to a machine having a connector interface has a flexible security circuit interposed between the inner surface of the front panel of the housing and the multi-layer printed circuit board, the flexible security circuit having a plurality of conductive pathways for determining if the flexible security circuit has been tampered with.

In one embodiment, the keypad for connecting to a machine having a connector interface has a housing with an opening to accommodate a window lens for viewing a display carried by the machine.

In one embodiment, the keypad for connecting to a machine having a connector interface has a multi-layered printed circuit board comprising at least two internal security-shield layers having switch trace protection interposed between the front and back faces with a pair of conductive pathways positioned around the periphery of each layer creating a closed loop for use in determining if the multi-layered printed circuit board has been edge tampered with.

In one embodiment, the keypad for connecting to a machine having a connector interface has a dome layer interposed between the flexible security circuit and the multi-layer printed circuit board.

Another aspect of the present invention is a keypad for connecting to a machine having a connector interface, comprising a housing having a front panel with an outer face and inner surface, the front panel having a plurality of openings and a plurality of sides projecting from the front panel defining an area; a plurality of keycaps protruding through the openings on the front panel from the inner surface to the outer face; a multi-layer printed circuit board having a front face having a plurality of conductive pathways, wherein the movement of one of the keycaps connects with one of the plurality of conductive pathways, the multi-layer printed circuit board having a back face with a plurality of terminals (contact points) associated with at least some of the conductive pathways; a flexible security circuit interposed between the inner surface of the front panel of the housing and the multi-layer printed circuit board, the flexible security circuit having a plurality of conductive pathways for determining if the flexible security circuit has been tampered; a silicon-rubber keypad actuator interposed between the plurality of key caps and the inner surface of the front panel of the housing and the flexible security circuit; a plurality of connectors extending from terminals on the back face of the circuit board to the connector interface of the machine; a collar for encircling the connectors that extend from the back face of the multi-layer printed circuit board to the machine to limit access to the plurality of connectors; and a rear backer secured to the housing for enclosing the area.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

A keypad is used to enter data into a device or machine such as an automatic teller machine (ATM), a credit card reader, or a point of sale (POS) or financial terminal. While the keypad may be used with other secured devices such as a card reader for security reasons, it still is not desirable to allow a third party to gain information regarding the key strokes made to enter information such as a personal identification number (PIN) or other personal or financial information. The keypad of the present invention has certain elements and features to prevent a third party from attempting to access information from within the keypad.

The keypad of the present invention must meet a standard level of security. The testing is typically conducted by an independent testing agency. The testing agency connects the keypad to a machine and then uses various means and methods to attempt to break into the keypad. If they break in, or gain access to any information, the keypad fails, and if they cannot break in, the keypad device passes the security testing. One industry standard is the PCI Data Security Standard ("DSS"), and more specifically the PIN Transaction Security ("PTS") Requirements for Manufacturers. These standards are technical and operational requirements set by the Payment Card Industry Security Standards Council, which is comprised of several major credit card companies. The standards globally govern all merchants and organizations that store, process, or transmit this data, and include specific requirements for software developers and manufacturers of applications and devices used in the transaction process. (See www.pcisecuritystandards.com). The new requirements are Point of Interaction (POI) Modular Security Requirements v3.1, and are designed to, among other things, deter access to user information for 8 hrs.

Figure 1:
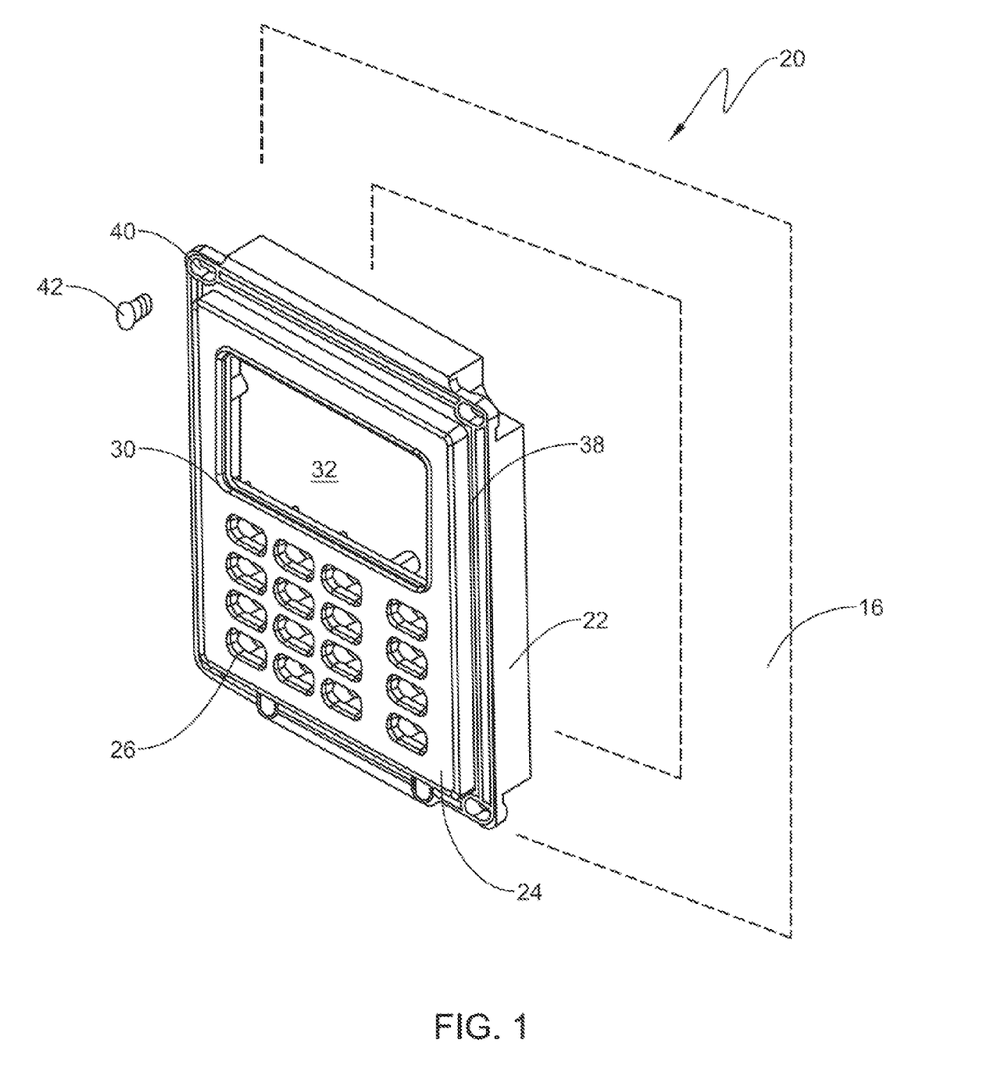
FIG. 1 shows a perspective view of one embodiment of the keypad of the present invention.

In FIG. 1, a perspective view of one embodiment of the keypad of the present invention is shown. More particularly, FIG. 1 shows a perspective view of a housing 22 of a keypad 20. The keypad 20 has a housing 22 with a front panel 24. The front panel 24 has a plurality of openings 26 for receiving keycaps 28 (not shown). In addition, the front panel 24 of the housing 22 has an optional second opening 30 for receiving a window lens 32. The window lens 32 allows a user to see a screen located on a machine 16, which is shown in phantom. The machine 16 is what the keypad 20 is secured to when installed. As will be explained in further detail below, the signal generated by the keypad 20 is used by the machine 16 to complete certain processes such as entering the PIN on an ATM machine, a credit card reader, or a point of sale (POS) or financial terminal.

Still referring to FIG. 1, the housing 22 of the keypad 20 has a plurality of sides which define an area, or box. The housing 22 has a mounting edge 38 with a plurality of openings 40 for assisting in securing the keypad 20 to the machine 16. A plurality of fasteners 42 are shown exploded away from the housing 22.

Figure 2:
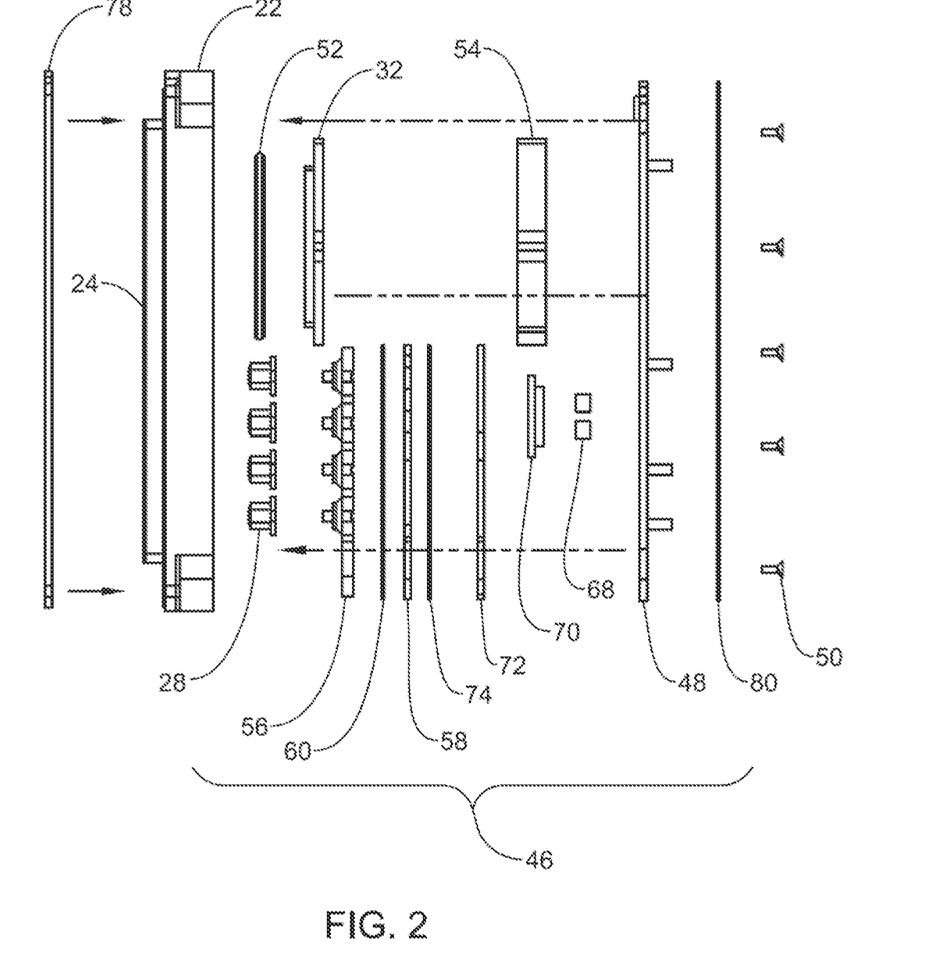
FIG. 2 shows a side exploded view of one embodiment of the keypad of the present invention.

In FIG. 2, a side exploded view of one embodiment of the keypad of the present invention is shown. More particularly, FIG. 2 shows a side exploded view of the keypad 20 where a series of components 46 including the keycaps 28 and the window lens 32 are retained in the area, or box defined by the housing 22. The components 46 are held in the area, or box, defined by the housing 22 using various alignment techniques and a rear backer 48 that is secured to the housing 22 by a plurality of fasteners 50. While a majority of the components of the keypad 20 will be described in further detail, a brief description of all the major components 46 is described here. Interposed between the window lens 32 and the front panel 24 of the housing 22 is a seal 52 that seals the window lens 32 in the opening 26 of the housing 22 (not shown). A lens backer spacer 54 is interposed between the window lens 32 and the rear backer 48. The keypad 20 has a silicon rubber keypad actuator 56 interposed between the keycaps and a multi-layer printed circuit board 58. The keypad 20, in addition, has a double-sided flexible security circuit 60 interposed between the silicon rubber keypad actuator 56 and the printed circuit board 58. Interposed between the flexible security circuit 60 and the silicon rubber keypad actuator 56 is a dome layer (not shown). The dome layer could alternatively be located in between the flexible security circuit 60 and the printed circuit board 58. The dome layer (not shown) is comprised of a high-temperature polyester, metal, or the like.

Still referring to FIG. 2, interposed between the multi-layer printed circuit board 58 ("PCB") and the rear backer 48 is a PCB/backer spacer 72. Another component 46 interposed between the multi-layer printed circuit board 58 and the rear backer 48 is an insulator 74 that is interposed between the PCB 58 and the PCB/backer spacer 72. A gasket 78 overlies the housing 22 to prevent exposure to the elements, such as dust, moisture and the like. The keypad 20, in addition, has a rear insulator 80 interposed between the rear backer 48 and the machine 16. It is recognized that the side of the housing 22 in some portions extends into the machine 16.

Figure 6A:
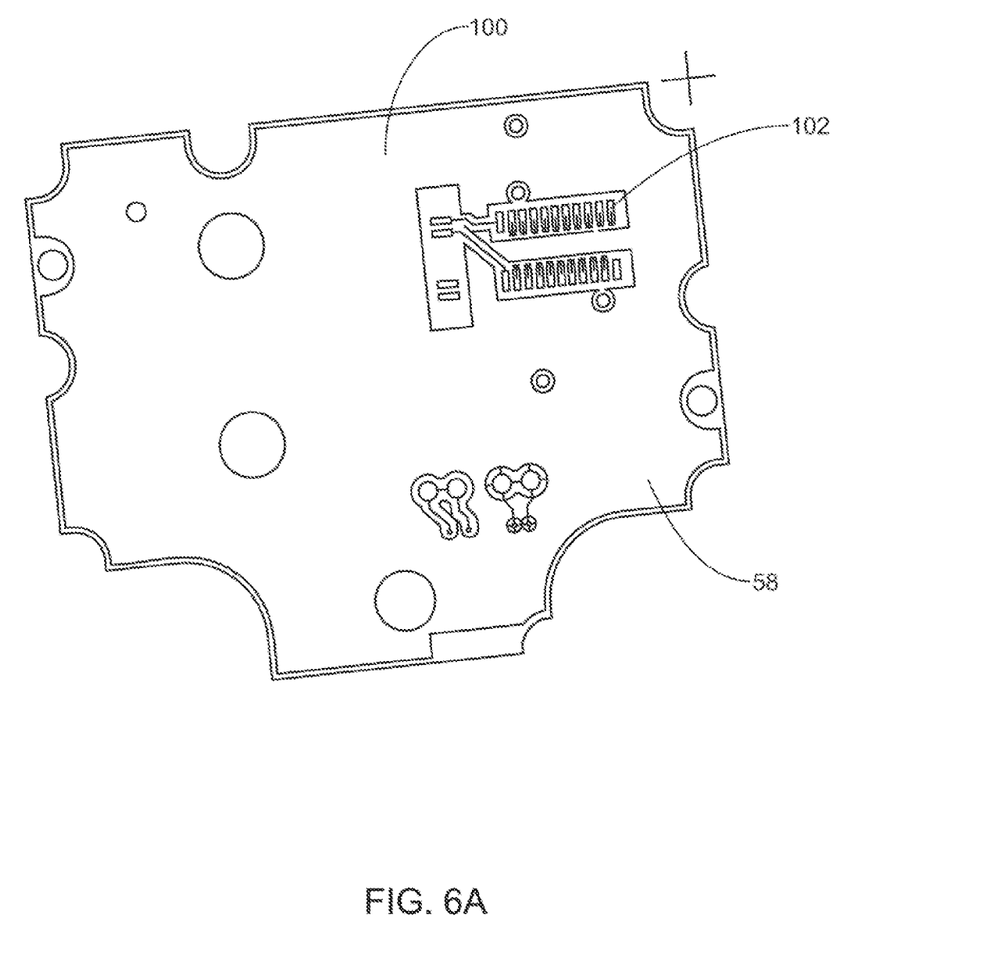
FIG. 6A and FIG. 6B show a back and front view of layers of the multi-layer printed circuit board of one embodiment of the keypad of the present invention.

As will be explained in further detail below, the back face of the printed circuit board 58 has a plurality of contacts 102 (as best seen in FIG. 6A), from which the printed circuit board 58 conveys signals or information to the machine 16. The keypad 20 has a plurality of connectors 68, referred to as zebra connectors in one embodiment, to convey this signal. One of the features of the keypad 20 of the present invention is preventing access to the flow of information through the zebra connectors 68. It is understood that zebra connectors are just one form of connector. Other connectors known to those of skill in the art are also applicable, including pin connectors, and the like.

Preventing access to the flow of information is done, in part, by using a hardened steel collar 70 which, in addition to positioning the connectors 68, blocks access to the connectors. The collar 70 is positioned between the rear backer 48 and the PCB/backer spacer 72, but sits on the same plane as the PCB/backer spacer 72 when assembled. Thus, the collar 70 blocks any attempt at side entry to the connectors 68 by would-be thieves.

The keypad of the present invention contains multiple security mechanisms to prevent tampering with the device and accessing users' private information. One security mechanism is provided by the collar 70, which is made of hardened steel that has been machined in such a way as to form a physical block against access to the connectors 68 within the keypad. In one embodiment, the tool steel comprises tool steel of grade A2. In another embodiment, the collar comprises tool steel of grade D2. In other embodiments other grades of tool steel known to those of skill in the art are used. In all embodiments, the tool steel is hardened to RC63, or better, based on the Rockwell C hardness scale.

Figure 5A:
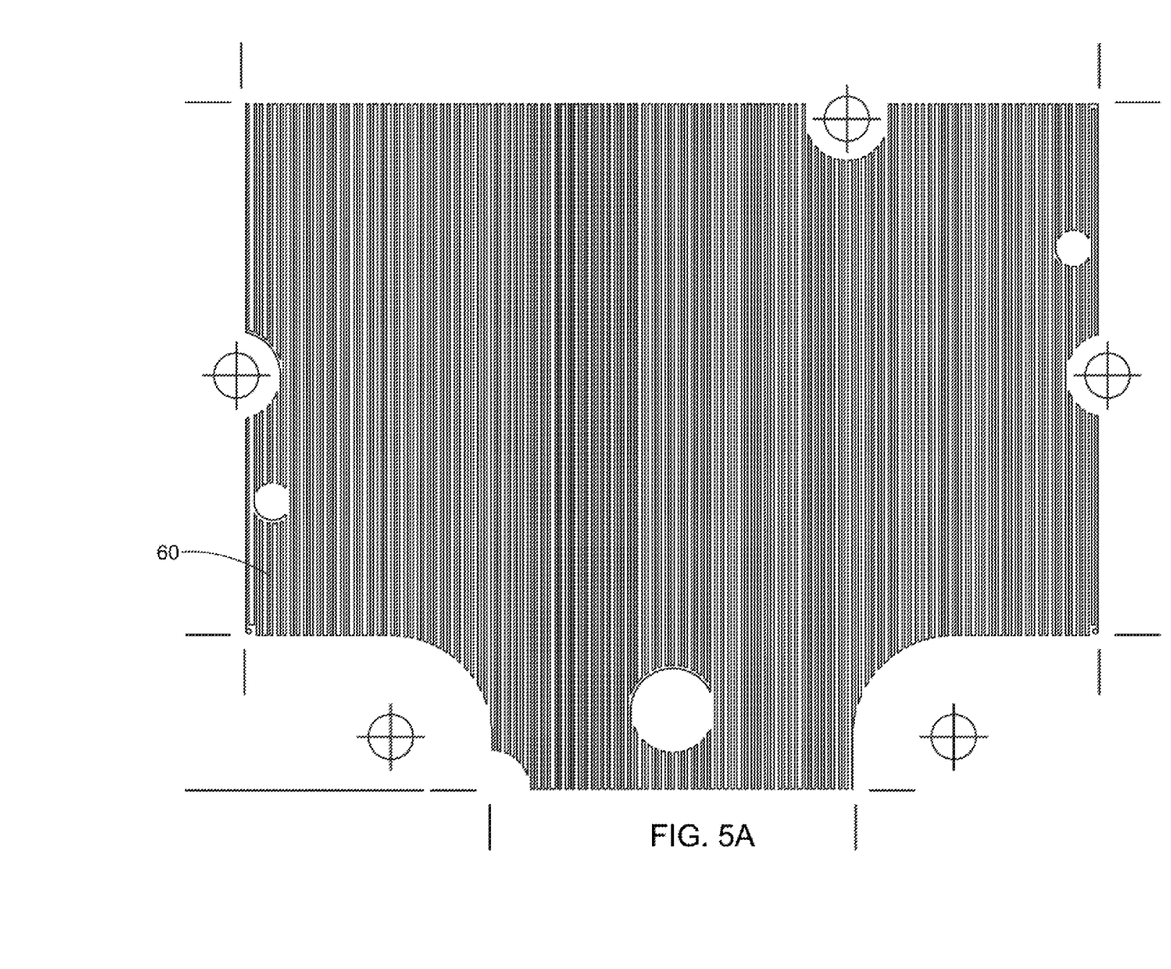
FIG. 5A, FIG. 5B, and FIG. 5C show front and back views of a flexible security circuit of embodiments of the keypad of the present invention.
Figure 5B:
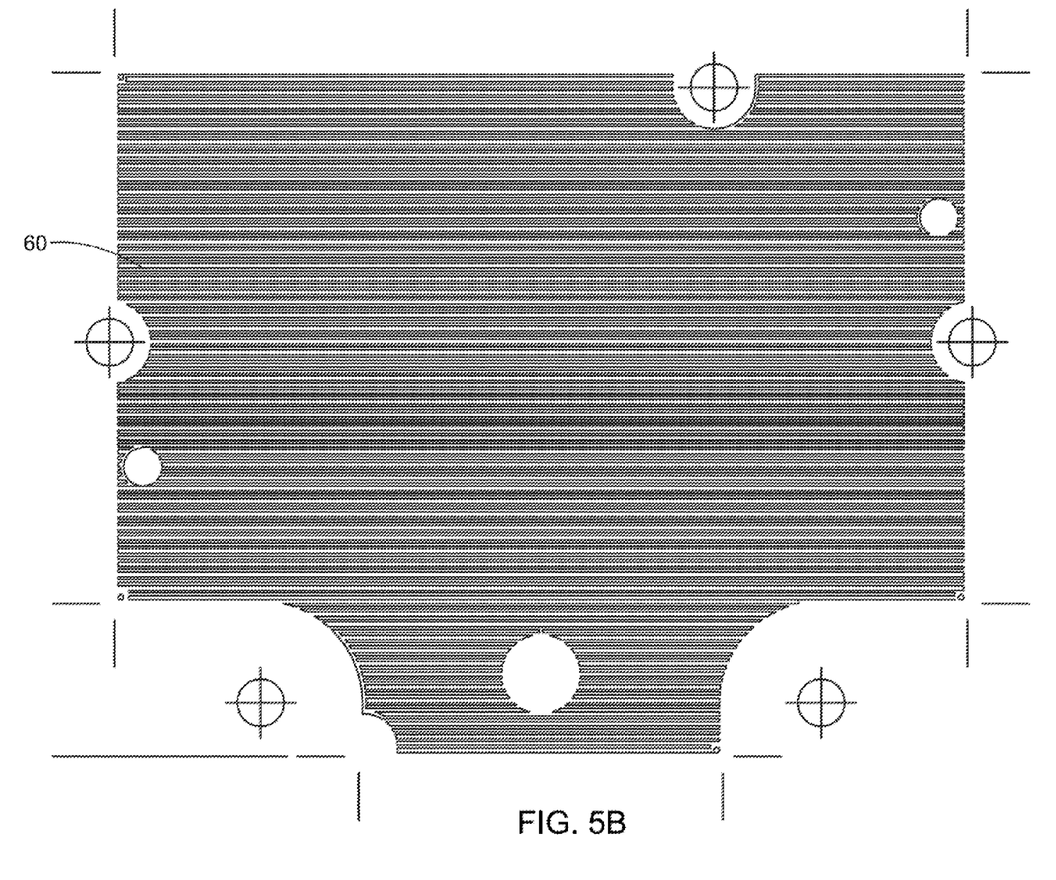
Figure 5C:
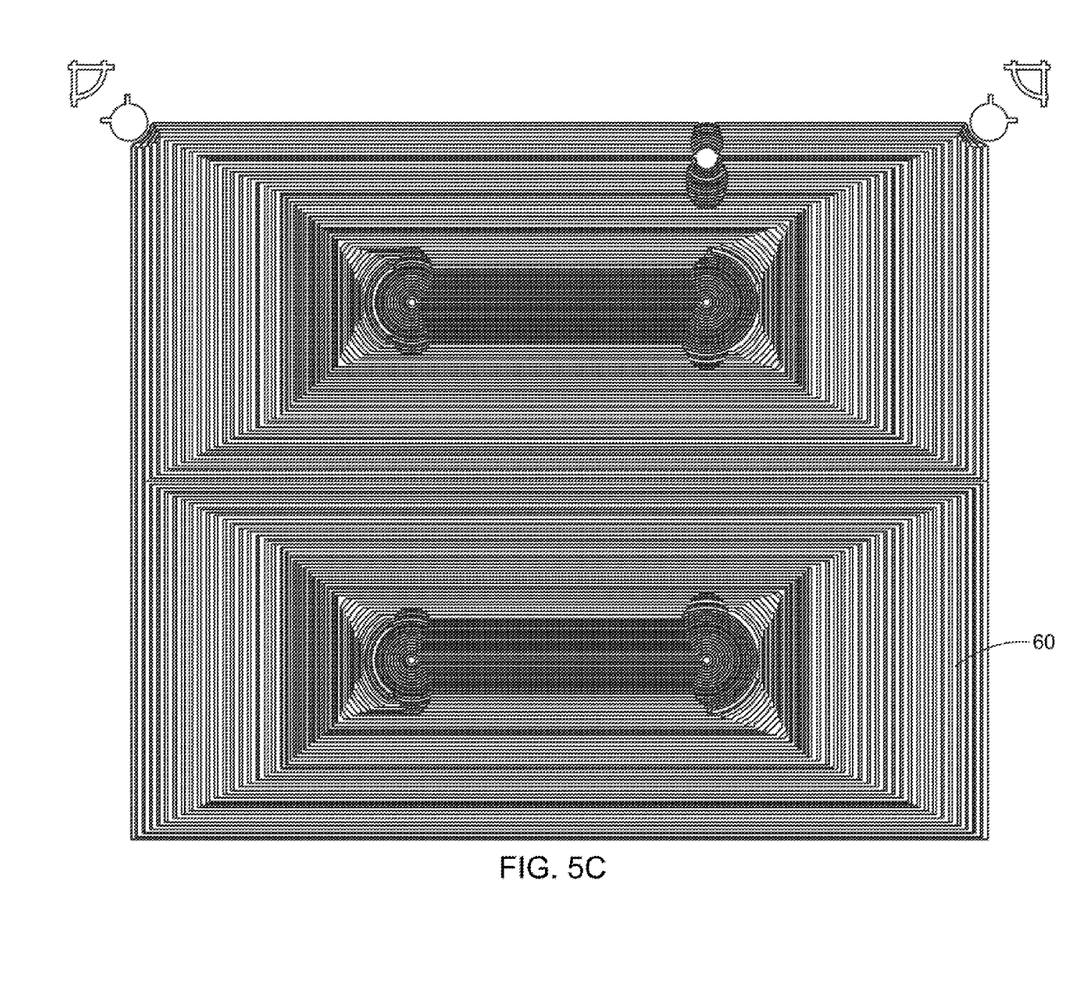

Another level of security is provided by the double-sided flexible security circuit 60 (as best seen in FIGS. 5A, 5B and 5C). This double-sided flexible security circuit is designed such that all information is erased if the double-sided flexible security circuit senses tampering, thus preventing any access to user data. One embodiment of the double-sided flexible security circuit comprises multiple layers produced via screen printing techniques using carbon, silver, and other conductive inks, and an ultraviolet dielectric layer. One embodiment of the double-sided flexible security circuit comprises multiple layers produced via etching copper layers from a polyamide substrate. Other methods known to those of skill in the art may be used to produce the fine traces used in the embodiments of the present invention. The line widths for the traces of the present invention range from about 0.08 mm to about 0.25 mm. The gap width between adjacent traces of the present invention range from about 0.08 mm to about 0.20 mm.

Yet another security mechanism in one embodiment of the keypad of the present invention is a multi-layer printed circuit board with internal security layers. In one embodiment of the present invention, the multi-layer printed circuit board has six layers. There are front and back layers, as well as multiple security-shield layers which sense pressure, drilling, disassembly, and the like. When tampering or damage is sensed by a security-shield layer the electronically stored information is erased, thus preventing access to user data. The security-shield layers can by multi-layered. There are generally two or more security-shield layers in the PCB in order to provide additional built-in redundancy for heightened security. Lastly, the housing of the keypad can be made of a tamper-resistant or tamper-evident material such as metal. The vertical distance between copper layers is about 0.25 mm, thus preventing any drilling into the unit without detection.

Figure 3:
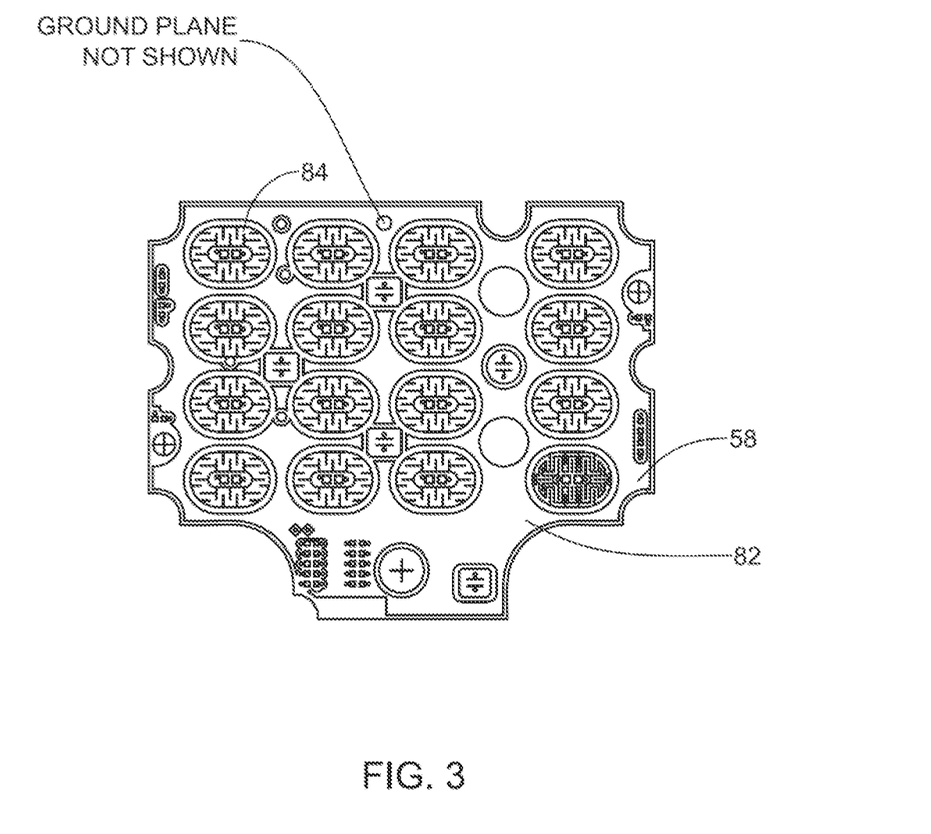
FIG. 3 shows a front view of a multi-layer printed circuit board of one embodiment of the keypad of the present invention.

In FIG. 3, a front view of a multi-layer printed circuit board of one embodiment of the keypad of the present invention is shown. More particularly, FIG. 3 shows a front view of the printed circuit board (PCB) 58 with a front face 82 that has a plurality of conductive patterns 84 consisting of single or double pole switches, such as made out of copper, through which a current may flow. The pressing of a keycap 28, such as seen in FIG. 1, depresses a portion of the silicon-rubber keypad actuator 56 and the flexible security circuit 60 such that carbon pills or pads make contact on the back of the flexible security circuit 60 which touches contacts to form a circuit with the associated portion on the printed circuit board 58. As noted previously, there may also be a dome layer interposed between the silicon-rubber keypad actuator 56 and the flexible security circuit 60.

Figure 4:
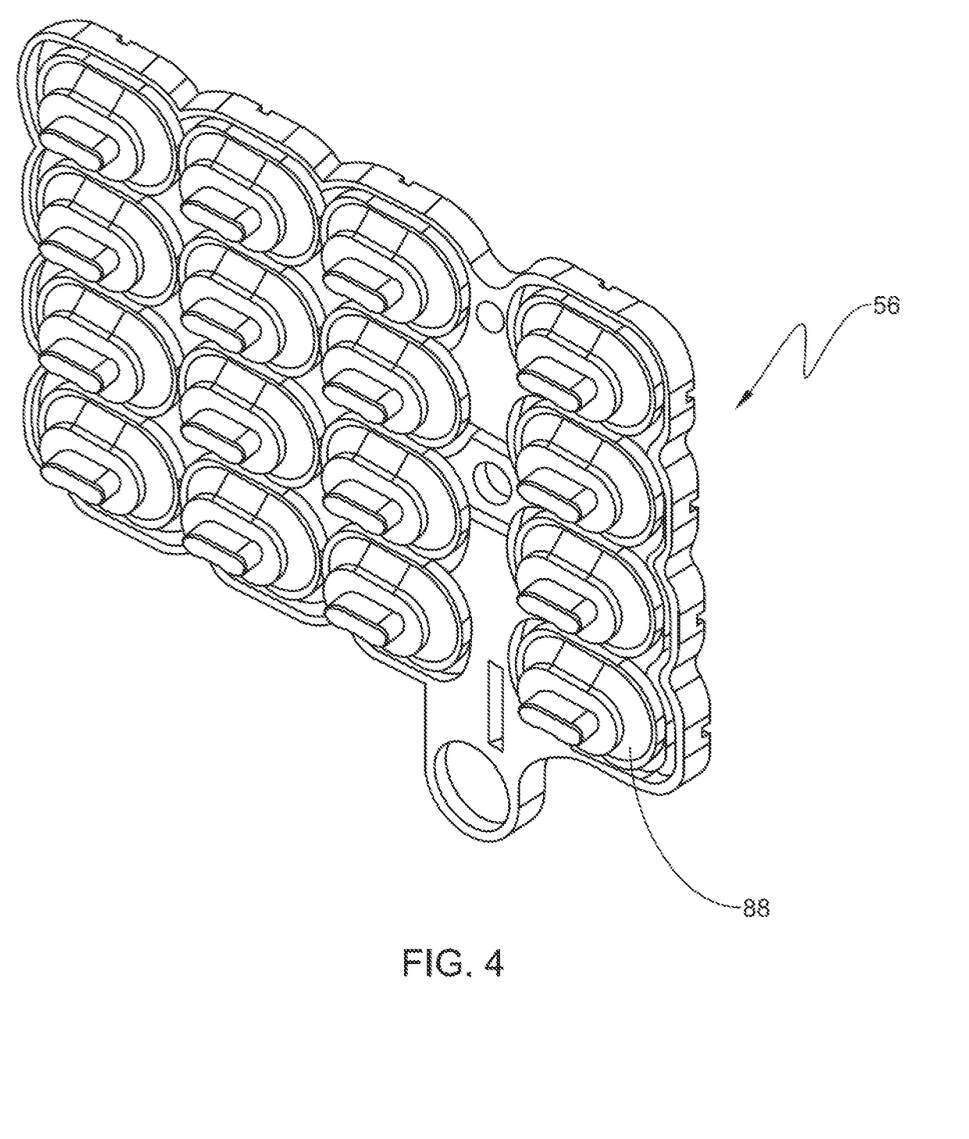
FIG. 4 shows a perspective view of the keypad actuator of one embodiment of the keypad of the present invention.

In FIG. 4, a perspective view of the keypad actuator 56 of one embodiment of the keypad of the present invention is shown. The silicone-rubber keypad actuator 56 is interposed between the keycaps 28 (as best seen in FIG. 1) and the PCB 58 to prevent weather, such as rain, and contaminants such as dirt, from making contact with the PCB 58. The silicone-rubber keypad actuator 56 would prevent water, dust, and other items which may enter through the openings 26 in the housing 22 from making contact with any electrical component. The silicone-rubber keypad actuator 56 has a raised area 88 associated with each keycap 28. The raised area 88 is flexible such that upon pushing the keycap 28, the raised area 88 can collapse to apply pressure to the silicone-rubber keypad actuator 56 overlying the proper location on the printed circuit board 58. The resiliency of the raised area 88 allows the keycap 28 to move back into its resting position after a user stops depressing the keycap 28.

The keypad 20 may be located in locations outside of buildings and accessible at all times of day and, therefore, potentially susceptible to vandals and/or tampering. Components such as the housing 22 and the keycaps 28 being made out of metal such as chrome-plated zinc reduces susceptibility to both vandals and tampering. While vandalism is not condoned, if a third party took a sledge hammer to the keypad 20, the owner and most potential users would not attempt to enter sensitive data such as a PIN number in the keypad. However, a bigger concern is tampering wherein a third party does something that is not readily apparent when a user enters sensitive data such as a PIN number into the keypad.

In FIGS. 5A, 5B, and 5C views of a flexible security circuit of an embodiment of the keypad of the present invention are shown. More particularly, the flexible security circuit 60 has on the front or rear face a plurality of circuitry that is capable of detecting when a third party attempts to drill through or otherwise penetrate the flexible security circuit 60. For example, if a third party attempts to drill a hole to access the printed circuit board by drilling a hole through the flexible security circuit 60, that hole through the flexible security circuit 60 would likely break the conductor pattern therein, changing the flow of current through the front or rear face of the flexible security circuit. The rear face of the flexible security circuit 60 also has metal contacts that bridge between contacts on the printed circuit board 58 when a keycap 28 is depressed.

Still referring to FIGS. 5A, 5B, and 5C, there are a variety of patterns available for the tamper sensing flexible security circuits. In one embodiment, as shown in FIGS. 5A and 5B, the circuits are oriented perpendicular to each other. On a first surface is circuit A (as seen in FIG. 5A) and on the second surface is circuit B, which is oriented perpendicular to circuit A (as seen in FIG. 5B). In another embodiment, as seen in FIG. 5C, circuits A and B are on a single side of the flexible security circuit 60. The traces vary in orientation and the width changes as the traces get closer to the tamper circuit to PC board interconnect. The tamper sensing properties of the flexible security circuit can be exercised if circuit A and circuit B touch, or if one of the circuits is cut. It is recognized that the tight spacing of the traces enables very sensitive tamper detection. The tamper sensing properties of the flexible security circuit are also exercised in the separation of the tamper circuit to PC board interconnect, which occurs with an attempt to disassemble. As disassembly is attempted, pressure applied by a compressive contact on the SR keypad to the tamper circuit interconnect is reduced, causing separation which also disturbs the security circuit. In one embodiment, the flexible security circuit 60 also comprises a polyamide substrate with copper on both the top and bottom surface, each with different etch patterns. The flexible security circuit 60 further comprises a polyamide cap which is screen printed with carbon on the bottom surface to produce a contact surface, a UV-cured dielectric spacer may be printed around this contact to provide defection properties of the conductive contact. It is understood that other spacers are also possible, including adhesive and dry film spacers, where the spacers are produced in adhesive form (wet) and dry film form.

In FIG. 6A, a back view of the printed circuit board of one embodiment of the keypad of the present invention is shown. More particularly, the back face 100 of the printed circuit board 58 is shown, where the circuitry (conductive pattern 84) located on the front face of the PCB 58 as seen in FIG. 3 is connected to a plurality of contacts 102 located on the back face 100 of the printed circuit board 58. It is the signals and/or currents that are found at these contacts at the back of the printed circuit board 58 that need to be conveyed to the machine 16.

Figure 6B:
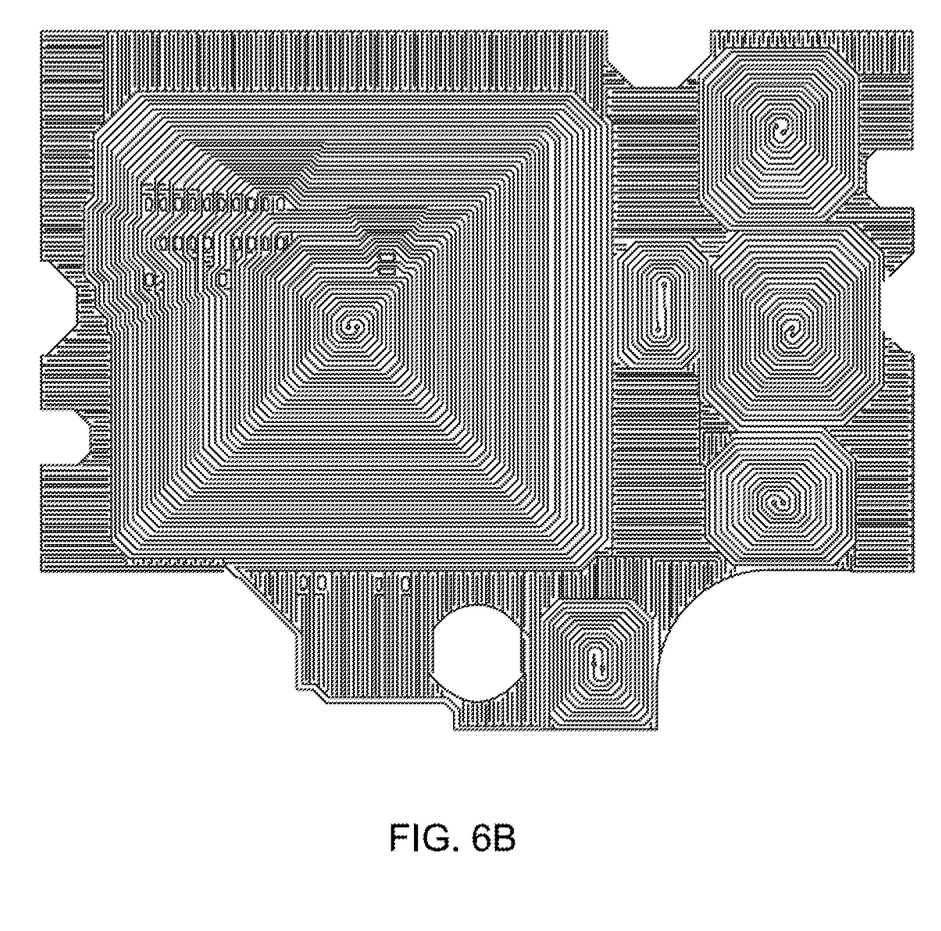

In FIG. 6B, a security layer of the printed circuit board of one embodiment of the keypad device of the present invention is shown. The dual circuits A and B are located on the same surface, as in the flexible security circuit 60 shown in FIG. 5C. As seen in FIG. 6B, the circuit pattern creates an inter-digitated pattern around the periphery of the layer in addition to several spiraling patterns located at various locations. Just as with the flexible security circuits, it is recognized that the tight spacing of the traces of the present invention enables very sensitive tamper detection.

Figure 7:
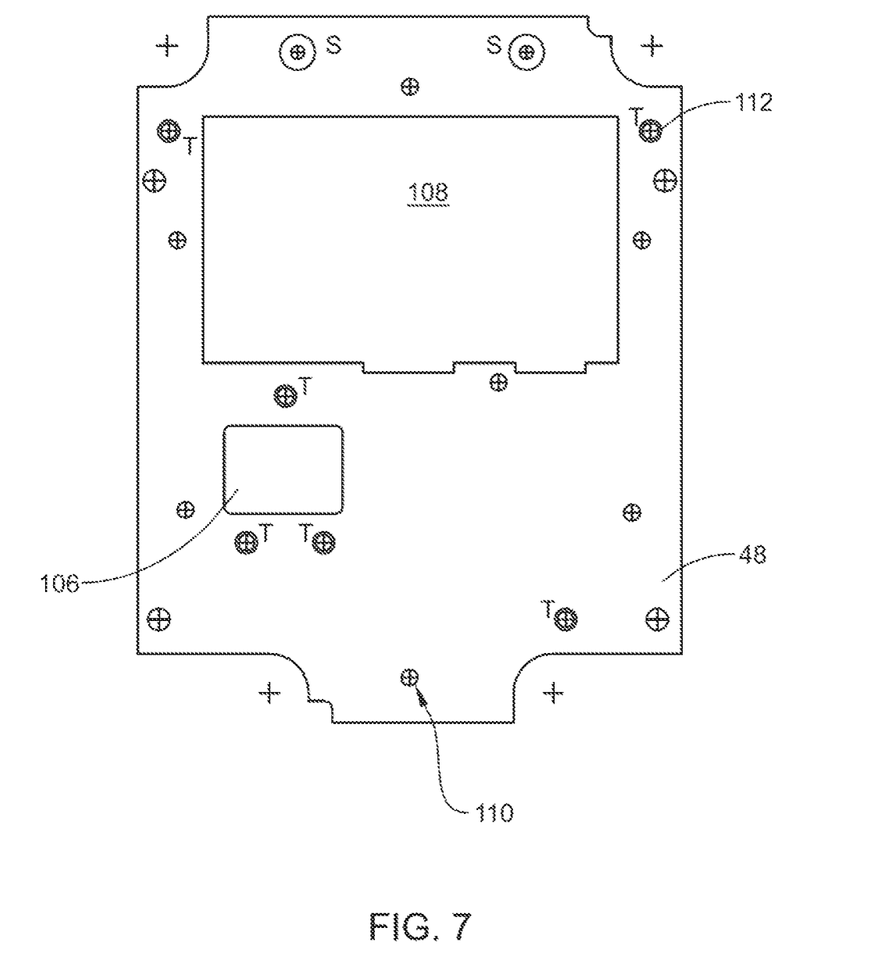
FIG. 7 shows a front view of the backer plate of one embodiment of the keypad of the present invention.

In FIG. 7, a front view of the backer plate of one embodiment of the keypad of the present invention is shown. Information is conveyed via the connectors 68 (not shown) through an opening 106 in the rear backer 48. The rear backer 48 is shaped to the housing 22 such that the area, or box, defined by the housing 22 is sealed. The rear backer 48 has a plurality of holes 110 for receiving fasteners 50. The rear backer 48 has several threaded posts 112 used for assembly of the keypad. The rear backer 48 has a pair of openings 106 and 108. The larger opening 108 is aligned with the window lens 32 located on the front panel 24 of the housing 22 such that a display located on the machine 16 can be seen (as best seen in FIG. 1). The smaller opening 106 is aligned with the connectors 102 (as best seen in FIG. 6) located on the back of the printed circuit board 58. While a detailed view of the PCB/backer spacer 72 as seen in FIG. 2 is not shown, it likewise has an opening aligned with the connectors 102 on the rear face 100 of the PCB 58.

Figure 8A:
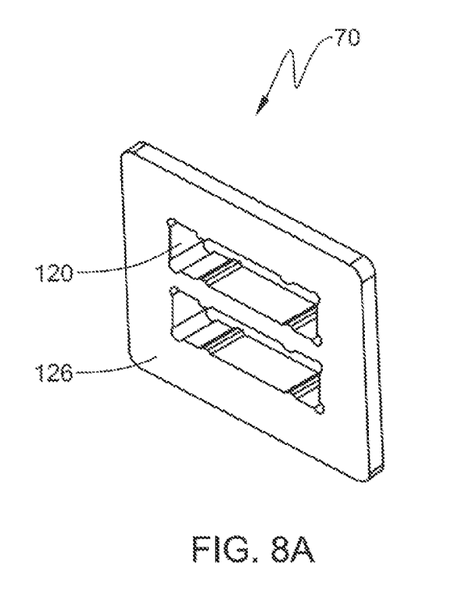
FIG. 8A and FIG. 8B show perspective views of a holder of one embodiment of the keypad of the present invention.
Figure 8B:
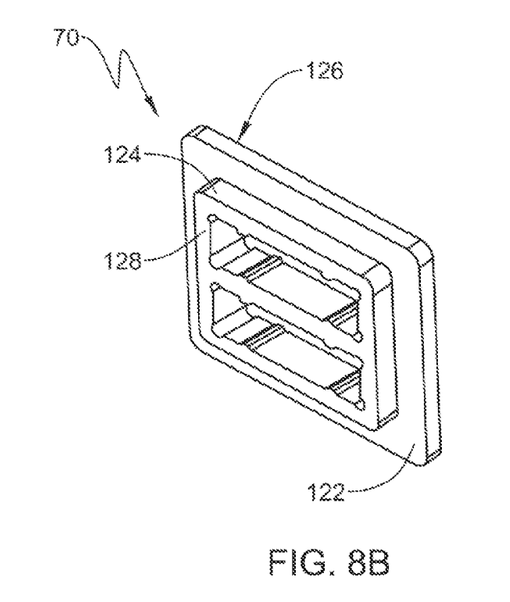

In FIG. 8A and FIG. 8B perspective views of a collar of one embodiment of the keypad of the present invention are shown. The collar 70 has a rectangular shape with a pair of channels 120 extending through the collar 70. Other embodiments may have one or more such channels. In one embodiment of the present invention, each channel 120 receives one of the zebra connectors 68. In addition, the collar 70 has a flange 122, wherein the flange 122 is sized to the opening in the PCB/backer spacer 72 and the main body 124 is sized for the opening 106 in the rear backer 48 or cover. The top 126 of the flange 122 of the collar 70 engages the rear face 100 of the PCB 58 and the bottom 128 of the collar 70 engages the face of the machine 16. In a preferred embodiment, the collar 70 is made of machined hardened tool steel such that a third party would have difficulty accessing the zebra connectors by drilling through the holder, and at the same time not producing noticeable damage to the keypad 20 that would be easily recognizable.

Figure 9:
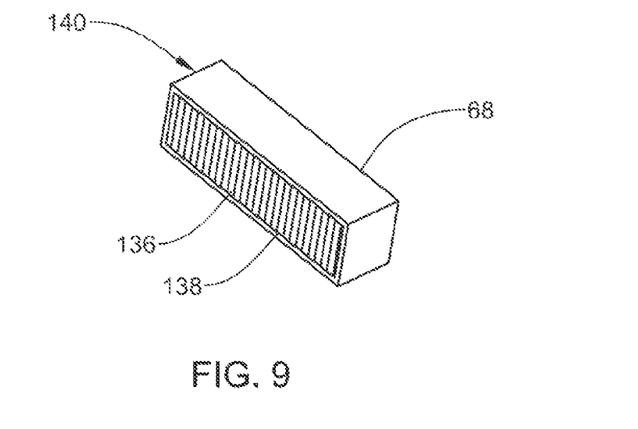
FIG. 9 shows a perspective view of a connector of one embodiment of the keypad of the present invention.

In FIG. 9, a perspective view of a connector of one embodiment of the keypad of the present invention is shown. More particularly, a perspective view of a zebra connector 68 is shown where the zebra connector 68 has a plurality of parallel spaced connectors 136 that extend from the connection 102 on the rear face 100 of the PCB 58, as best seen in FIG. 6, to the connectors 18 on the machine 16 (not shown). Other embodiments may be a single connection. Interposed between the connectors 136 in the zebra connector 68 are internal insulators 138. In addition, there is an outside insulator 140 which encircles the entire set of connectors 136. Both the position of the connectors 68 and the items that surround the connectors 68, such as the collar 70, create a deterrent to a criminal gaining access to the signal. It is understood that a variety of connectors can be used in embodiments of the present invention.

Figure 10:
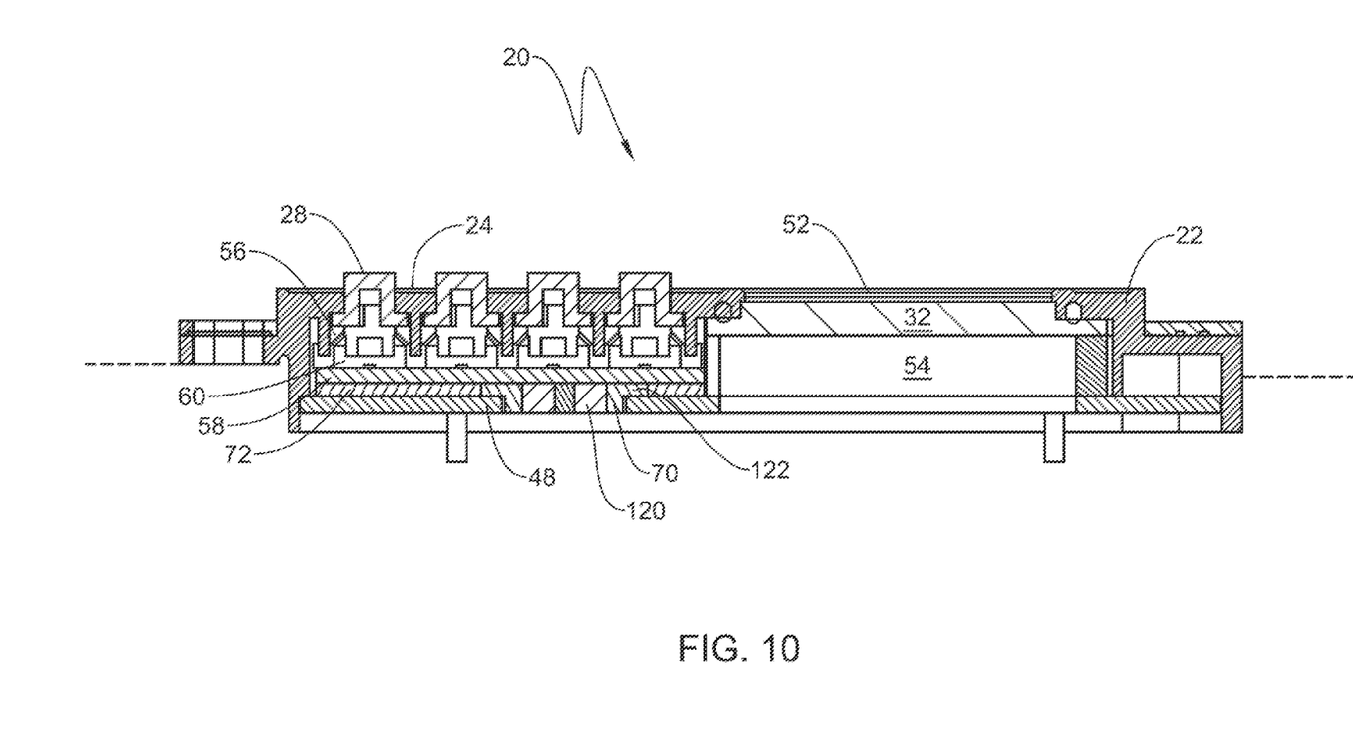
FIG. 10 shows a cross-sectional view of one embodiment of the keypad of the present invention.

In FIG. 10, a cross-sectional view of one embodiment of the keypad of the present invention is shown. More particularly, the keypad 20 has a housing 22 with a front panel 24. The front panel 24 has a plurality of openings 26 for receiving keycaps 28. The keypad 20 has a window lens 32 covered by a seal 52 that seals the window lens 32 in the opening 26 of the housing 22. A lens backer spacer 54 is interposed between the window lens 32 and the rear backer 48. The keypad 20 has a silicon rubber keypad actuator 56 interposed between the keycaps 28 and a multi-layer printed circuit board 58. The keypad 20, in addition, has a double-sided flexible security circuit 60 interposed between the silicon rubber keypad actuator 56 and the printed circuit board 58. In one embodiment, there is a dome layer interposed between the printed circuit board 58 and the flexible security circuit 60 (not shown). The collar 70 is positioned between the rear backer 48 and the PCB/backer spacer 72, but sits on the same plane as the PCB/backer spacer 72 when assembled. The collar 70 has one or more channels 120 extending through the collar 70. In addition, the collar 70 has a flange 122, wherein the flange 122 is sized to the opening in the PCB/backer spacer 72 and the main body 124 (not shown) is sized for the opening 106 in the rear backer 48. In one embodiment, the top 126 of the flange 122 of the collar 70 engages the rear face 100 of the PCB 58 and the bottom 128 of the collar 70 engages the face of the machine 16.

The keypad of the present invention allows machine 16 to sense unpermitted entry into the keypad through various security mechanisms which protect frontal, side, and rear attack on the keypad electronics. The frontal protection is accomplished with a double-sided flexible security circuit which senses tampering, including, but not limited to drilling activity into the switch cavity. There is also case separation protection comprised of tamper switches which sense a separation of the case; e.g. compression pads on the keypad/actuator which match to contact pads on the back of the flexible security circuit, with further contact pads on the multi-layer printed circuit board. There is also switch trace protection of the multi-layer printed circuit board which has internal security circuitry that encapsulates the switch circuits and protects those circuits from attack and detection. The side protection includes a hardened steel collar. This feature protects the Z-axis interconnect from the interface multi-layer printed circuit board to the client electronics multi-layer printed circuit board. This protects from side attack into the keypad. The keypad of the present invention encompasses many security mechanisms which together create a keypad that meets, or exceeds, the requirements of the PCI DSS Point of Interaction (POI) Modular Security Requirements v3.1, and as such deters access to a user's information for at least 8 hours.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A keypad for connecting to a machine having a connector interface, comprising
    a housing having a front panel with an outer face and inner surface, the front panel having a plurality of openings and a plurality of sides projecting from the front panel defining an area;
    a plurality of keycaps protruding through the openings on the front panel from the inner surface to the outer face;
    a multi-layer printed circuit board having a front face having a plurality of conductive pathways, wherein the movement of one of the keycaps connects with one of the plurality of conductive pathways, the multi-layer printed circuit board having a back face with a plurality of terminals associated with at least some of the conductive pathways;
    two or more security-shield layers within the multi-layered printed circuit board comprising switch trace protection interposed between the front and back faces, comprising a pair of conductive pathways positioned around the periphery of each layer creating a closed loop for determining if the multi-layered printed circuit board has been edge tampered with;
    a flexible security circuit interposed between the inner surface of the front panel of the housing and the multi-layer printed circuit board, the flexible security circuit having a plurality of conductive pathways spaced apart by about 0.25 mm to about 0.8 mm for determining if the flexible security circuit has been tampered with;
    a plurality of connectors extending from terminals on the back face of the circuit board to the connector interface of the machine; and
    a collar for encircling the connectors that extends from the back face of the multi-layer printed circuit board to the machine to limit unauthorized access to the plurality of connectors.

2. A keypad for connecting to a machine having a connector interface of claim 1, wherein the collar is made of hardened tool steel.

3. A keypad for connecting to a machine having a connector interface of claim 1, wherein the housing comprises tamper-resistant metal.

4. A keypad for connecting to a machine having a connector interface of claim 1, further comprising a silicon-rubber keypad actuator interposed between the inner surface of the front panel of the housing and the flexible security circuit wherein the silicon-rubber keypad actuator engages tamper switches on the flexible security circuit.

5. A keypad for connecting to a machine having a connector interface of claim 1, further comprising a dome layer interposed between the flexible security circuit and the multi-layer printed circuit board.

6. A keypad for connecting to a machine having a connector interface of claim 1, wherein the housing has an opening to accommodate a window lens for viewing a display carried by the machine.

7. A keypad for connecting to a machine having a connector interface of claim 1, wherein a plurality of the connectors comprises a block a front face and a back face, the block having a plurality of alternating conductors and insulators extending parallel to each other, the block having an insulating layer encircling the plurality of alternating conductors and insulators such that the block makes contact between the back face of the multi-layer printed circuit board and the machine via the front and back faces.

8. A keypad for connecting to a machine having a connector interface, comprising
    a housing having a front panel with an outer face and inner surface, the front panel having a plurality of openings and a plurality of sides projecting from the front panel defining an area;
    a plurality of keycaps protruding through the openings on the front panel from the inner surface to the outer face;
    a multi-layer printed circuit board having a front face having a plurality of conductive pathways, wherein the movement of one of the keycaps connects with one of the plurality of conductive pathways, the multi-layer printed circuit board having a back face with a plurality of terminals associated with at least some of the conductive pathways;
    two or more security-shield layers within the multi-layered printed circuit board comprising switch trace protection interposed between the front and back faces, comprising a pair of conductive pathways positioned around the periphery of each layer creating a closed loop for determining if the multi-layered printed circuit board has been edge tampered with;
    a flexible security circuit interposed between the inner surface of the front panel of the housing and the multi-layer printed circuit board, the flexible security circuit having a plurality of conductive pathways spaced apart by about 0.25 mm to about 0.8 mm for determining it the flexible security circuit has been tampered with;
    a silicon-rubber keypad actuator interposed between the inner surface of the front panel of the housing and the flexible security circuit wherein the silicon-rubber keypad actuator engages tamper switches on the flexible security circuit;
    a plurality of connectors extending from terminals on the back face of the circuit board to the connector interface of the machine;
    a collar for encircling the connectors that extend from the back face of the multi-layer printed circuit board to the machine to limit unauthorized access to the plurality of connectors; and
    a rear backer secured to the housing for enclosing the area.

9. A keypad for connecting to a machine having a connector interface of claim 8, wherein the collar is made of hardened tool steel.

10. A keypad for connecting to a machine having a connector interface of claim 8, wherein the housing comprises tamper-resistant metal.

11. A keypad for connecting to a machine having a connector interface of claim 8, wherein the housing has an opening to accommodate a window lens for viewing a display carried by the machine.

12. A keypad for connecting to a machine having a connector interface of claim 8, wherein a plurality of the connectors comprises a block with a front face and a back face, the block having a plurality of alternating conductors and insulators extending parallel to each other, the block having an insulating layer encircling the plurality of alternating conductors and insulators such that the block makes contact between the back face of the multi-layer printed circuit board and the machine via the front and back faces.

13. A keypad for connecting to a machine having a connector interface of claim 8, further comprising a dome layer interposed between the flexible security circuit and the multilayer printed circuit board.

* * * * *